United States Patent Office 2,846,252
Patented Aug. 5, 1958

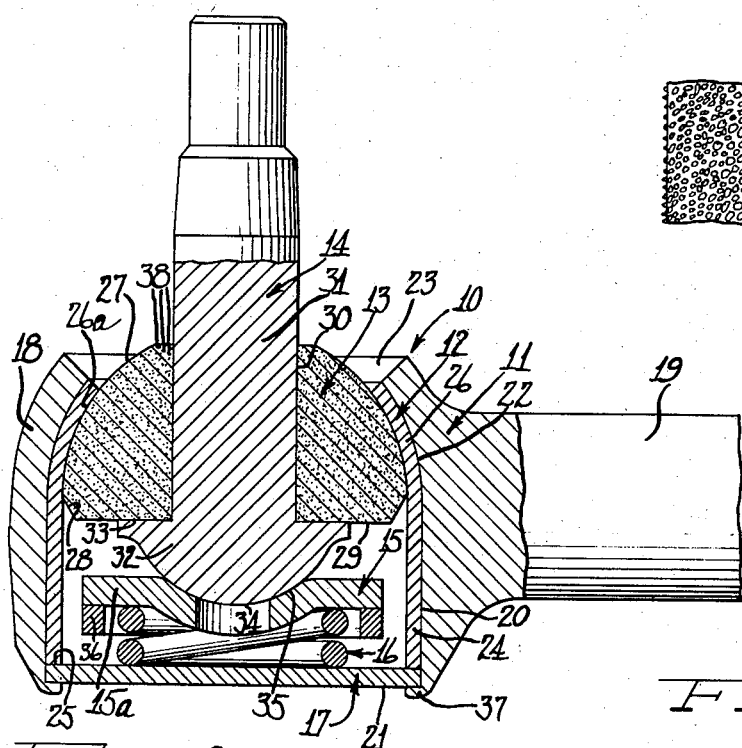

2,846,252
IMPREGNATED BEARING METAL JOINT

Edward J. Herbenar, Detroit, and Theodore R. Hoopes, Royal Oak, Mich., assignors to Thompson Products, Inc., Cleveland, Ohio, a corporation of Ohio Application May 25, 1954, Serial No. 432,229

3 Claims. (Cl. 287—90)

This invention relates to a metal bearing assembly having a non-metallic plastic material infiltrated into at least one of the bearing walls thereof to project from said wall and form an active bearing with a reduced coefficient of friction and an enhanced wear life.

Specifically, this invention relates to a bearing assembly including a powdered metal bearing element infiltrated with a non-metallic synthetic resin or plastic which extends beyond the metal particles to define a discontinuous active bearing surface which will resist wear, decrease friction, and remain firmly anchored in position to the rigid metal member into which it is infiltrated.

The invention will hereinafter be specifically described as embodied in a ball and socket type joint for automotive steering linkages, wheel suspensions and the like, because the bearings of this invention are especially well adapted for such joints. Such joints are frequently called upon to support very heavy loads and any tendency for the bearing material to extrude or be otherwise permanently deformed, will interfere with the efficiency of operation of these joints. It should be understood, however, that the invention is not completely limited to this preferred type of bearing assembly since the principles of this invention can be extended to many different types of bearing assemblies.

Heretofore, ball and socket joints have been equipped with non-metallic bearing members mainly in the form of liners or covers on the ball or socket part or both. In order for the ball and socket joint to have a wide latitude of tilting movement, it is necessary that the socket opening through which the joint stud extends be quite large. This large opening exposes a considerable area of the bearing ball member on the joint stud and reduces the ball area in contact with the bearing surface of the socket. Under heavy tension loads on the joint, unit pressure on the ball member will be quite high since the bearing area is restricted because of the large diameter of the hole. This high unit pressure on non-metallic plastic liners or covers has, in the past, caused the material to extrude or flow thereby destroying the desired bearing contour. In some instances, the plastic material will flow into the hole thereby forming a collar or ridge which will interfere with the free tilting of the stud in the housing. Thus, while the resin or plastic material possesses good bearing properties, it has not been successful in ball joints because of its flowability or deformation under high loads.

The present invention now makes possible the use of synthetic resin or plastic materials in ball and socket joints without encountering the heretofore deleterious flowing or extrusion of the material to interfere with good operation of the assembly.

In accordance with this invention, at least one of the joint parts is composed of porous powdered metal. The pores of this part, at least in the surface area thereof, are impregnated or infiltrated with the plastic material. The plastic material projects from the metal surface to form nubbins presenting a discontinuous bearing face as the active bearing surface of the member. The spaces between the nubbins serve as lubricant channels to lubricate the bearing. The projection of the plastic beyond the metal surface may be accomplished by expansion and moisture-absorbing properties of the plastic, by coining of the impregnated bearing member under pressure, by etching of the metals, or the like. In any event, the plastic is projected beyond the metal surface to preclude metal-to-metal contact in the assembly.

It is then an object of this invention to provide a bearing assembly having a plastic material bearing surface anchored in the pores of a porous metal member.

A still further object of this invention is to provide a plastic impregnated or infiltrated porous metal bearing member with the plastic material projecting beyond the surface of the metal to form a discontinuous active bearing face.

A still further object of this invention is to provide a ball and socket type joint with a plastic bearing surface having the plastic material anchored in the pores of a porous metal member.

A further object of the invention is to provide a ball and socket joint for automotive steering linkages, wheel suspensions, and the like, wherein the ball member is composed of porous powdered metal impregnated or infiltrated with non-metallic plastic to form an active bearing surface thereon.

Other and further objects of this invention will be apparent to those skilled in the art from the following detailed description of the annexed sheet of drawings which, by way of preferred examples only, illustrate two embodiments of the invention.

On the drawings:

Figure 1 is a longitudinal, cross-sectional view of a ball and socket joint equipped with a plastic-impregnated porous metal ball member according to this invention.

Figure 2 is a longitudinal, cross-sectional view, with parts in elevation, of another form of ball and socket joint according to this invention, embodying plastic-impregnated porous metal inserts.

Figure 3 is a magnified, fragmental, surface view of a bearing element used in the joints of Figures 1 and 2, illustrating the manner in which the plastic material projects beyond the surface of the metal body in which it is impregnated.

Figure 4 is a greatly magnified microstructural view of the bearing member for the joints of this invention illustrating the manner in which the plastic material is infiltrated or impregnated into the pores of the porous metal body and extends therefrom beyond the surface of the metal particles.

As shown on the drawings:

In Figure 1, the ball and socket joint assembly 10, is composed of a forged metal socket or outer housing 11, a stamped metal hardened liner 12, a plastic-impregnated porous metal ball 13, a tough metal stud 14, a metal bearing seat 15, a spring 16, and a metal closure disk 17.

The forged outer socket or housing 11, has an open-ended, annular cup-shaped end 18 with a laterally projecting externally threaded stem or arm 19. The cup end 18 has a straight cylindrical bore 20 extending inwardly from the large open end 21 thereof to a fragmental spherical bore 22 converging to a small diameter open top end 23.

The liner 12 has a cylindrical bottom end portion 24 terminating in spaced relation inwardly from the open bottom end 21 of the cup-shaped housing 18 to provide a stop or shoulder 25. A fragmental spherical converging portion 26 extends from the cylindrical portion 24 to the opening 23. This portion 26 defines an interior fragmental spherical bearing wall 26a.

The ball member 13 has a fragmental spherical outer wall 27 in bearing engagement with the surface 26a of the liner and this wall 27 spans the open mouth 23 of the housing and liner. The ball member 13 is greater than a hemisphere and the portion thereof beyond the great circle, is beveled at 28 to be spaced inwardly from the bearing wall 26a. A flat bottom 29 is provided on the ball member 13. A cylindrical bore 30 is provided axially through the ball member from the flat bottom 29 thereof to the top thereof. This cylindrical bore 30 is of appreciable length because the ball member 13 is greater than a hemisphere.

The stud 14 has a cylindrical shank portion 31 rotatably mounted in the bore 30 of the ball member 13. A head 32 of the stud has a flat top 33 underlying the flat bottom of the ball member 13 around the bore 30 to provide a shoulder in bearing engagement with the flat bottom of the ball member. The head has a fragmental spherical bottom 34 rockably seated in a rounded depression 35 of the spring seat 15. The coil spring 16 surrounds the depression 35 and acts on the marginal portion 15a of the seat to urge the seat against the ball head 32. A bottoming ring 36 underlies the margin 15a and surrounds the spring 16 to act as a stop preventing collapse of the spring.

The closure disk 17 is abutted against the bottom end 25 of the liner and fits snugly in the bore 20 of the housing. The open bottom 21 of the housing is peened or spun inwardly as at 37 to underlie the marginal portion of the closure disk and clamp the disk securely against the bottom 25 of the liner. This closure disk 17 bottoms the spring 16 so that it is maintained under compression to urge the spring seat 15 and thereby maintain the joint parts in operative assembly.

In operation, the spherical surface 27 of the ball member 13 rocks on the surface 26a of the liner 12 and the cylindrical portion 31 of the stud rotates about its own axis in the bore 30 of the ball member while the shoulder 33 of the stud head rides on the bottom 29 of the ball member.

During the rocking of the stud in the liner, the head 32 of the stud will rock in the seat 15.

It will be noted that a large portion of the spherical surface 27 of the ball member 13 is exposed in the opening 23 of the assembly. This large opening 23 is necessary in order to accommodate wide angulation of the stud in the housing. A small diameter opening would restrict the tilting of the stud since the stud shank would strike the housing after a limited degree of tilting.

The chamber in the housing 18 below the ball member 13 and above the closure disk 17 can be filled with lubricant.

The ball member 13 is composed of resin or plastic impregnated porous metal such as porous sintered powdered iron or steel impregnated with nylon. The nylon projects from the surface of the metal to form nubbins or peaks 38 which provide the active bearing face of the ball member. These peaks 38 will ride on the bearing wall 26a of the liner and the cylindrical stud portion 31 of the stud as well as the shoulder 33 of the stud head. The plastic material, therefore, forms the active bearing surfaces of the ball member and since it has excellent bearing and wear-resistant properties, improved joint action is obtained.

At the same time, the nubbins 38 are so securely anchored in the pores of the powdered metal ball member, that they cannot be deformed or extruded through the opening 23 to form a ridge or other obstruction which would interfere with the tilting movement of the ball.

In the embodiment shown in Figure 2, the assembly 10' has the parts identical to the parts described in the assembly 10 of Figure 1 identified with the same reference numerals. In the assembly 10', however, the ball member 13' is composed of a conventional solid bearing metal and the bore 30' thereof receives a tubular insert 40 composed of the plastic impregnated porous metal material like the ball member 13 of the assembly 10. This tube 40 can be pressed fit into the bore 30' and provides a bearing wall 41 for the stud shank 31.

A washer 42 of the same plastic impregnated porous metal as the tube 40, is interposed between the stud shoulder 33 and the flat bottom 29' of the ball member 13'. This washer 42 provides the active bearing surface so that the stud 14 is freely rotatable in the ball member 13'' while the ball member tilts on plain bearing walls on its outer surface and on the inner surface of the liner 12.

A spring seat 43 composed of plastic impregnated porous metal material has a central recess 44 receiving the rounded end 34 of the ball head 32 and a conical spring 45 urges this spring seat against the ball head. A closure disk 46 has a central depressed portion 47 receiving the large end of the conical spring 45. A radial flange 48 on the closure disk is bottomed against the end 25 of the liner 12 and has the open end of the housing peened thereunder as at 37 to lock the disk in position in the housing.

In operation of the joint assembly 10', the stud 14 will have its cylindrical shank 31 freely rotatable in the tube 40 and will have its stud head shoulder 33 freely rotatable on the washer 42 while its round end 34 will freely tilt in the spring seat washer 43.

The members 40, 42 and 43 like the ball 13 in the assembly 10 of Figure 1, will have nubbins or projections 38 of the plastic material forming the active bearing surfaces.

In the magnified view of Figure 3, the plastic impregnated powdered metal bearing members are exemplified by a body 50 having nubbins 51 projecting from the pores thereof. These nubbins are composed of plastic material and will be spaced apart and in conformity with the spacing of the pores in the skeleton body 50. The active surface of the bearing will, therefore, be discontinuous and will have voids 52 between the nubbins or projections. These voids, of course, will be bottomed by the metal body 50.

In the further magnification of the bearing 50 shown in Figure 4, the powdered metal particles are identified at 53 and the voids between these particles are identified at 54. As therein shown, these voids 54 are filled, at least in the surface area of the body 50, with the plastic 55. This plastic is thus firmly anchored in the pores and the projecting nubbins 51 of the plastic, are actually integral extensions of a network which is interlaced throughout the body particles 53 so as to be firmly anchored to the body.

In producing the bearing 50 of this invention, powdered metal particles such as iron, steel, or the like, are selected to have an average particle size of from about −80 to about −325 mesh. This powder is pressed in suitable shaping dies of the desired shape under pressures ranging from about 6 to 50 tons per square inch (t. s. i.) so that the compact exhibits a porosity of from about 30 to 10 percent.

The resulting compact is sintered at temperatures of about 900° and 1100° C. for a short period of time in a clean and dry protective atmosphere. This sintering increases the coherence and density of the compact.

A suitable resin or plastic bearing material is then infiltrated or impregnated into the resulting sintered porous body member. Most common suitable plastic bearing materials include synthetic polymeric amides (nylon), polytetra fluorethylene (Teflon), cellulose acetate, ethyl cellulose and phenol-formaldehyde (Bakelite).

The plastic material is reduced to a liquid molten state. The metal body member is heated to exclude all volatiles and is immersed in the liquid thermoplastic to absorb the plastic material into the pores thereof. Impregnation can be enhanced by inserting the metal body in a vacuum chamber and injecting the plastic after the pores of the body have been evacuated. In some instances, it may be desirable to form the plastic in situ in the pores as by impregnating the pores with the resin producing material and then introducing a catalyst or the like material for setting the resin forming ingredients.

In the case of thermosetting resins, the impregnated bearing member must be heat treated to set the resin. In the case of thermoplastic materials, it is only necessary to allow the assembly to cool below the solidified temperature of the plastics.

In the case of plastics such as nylon, Teflon, and the like, which expand when moistened or exposed to the atmosphere, the nubbins or projections 38 will be formed automatically by exposure of the unit to the atmosphere. These nubbins can be accentuated by coining the finished plastic impregnated member under pressure which will extrude some of the plastic material from the pores. Further, if desired, the metal can be etched by a suitable acid which will not attack the plastic material and the surface of the metal can be dissolved to expose more of the plastic material.

From the above description it will, therefore, be understool that this invention now provides bearings which have porous metal bodies firmly anchoring plastic bearing materials which project therefrom to form a discontinuous nubbin-like active bearing surface. The nubbins are firmly anchored in the pores of the metal and will not be torn loose or sheared off in use of the assembly even under high loads.

It will be understood that variations and modifications may be effected without departing from the scope of the novel concepts of the invention.

We claim as our invention:

1. A ball and socket type joint adapted to withstand heavy loads in automotive linkages and the like which comprises a ball housing, a ball assembly tiltable and rotatable in said housing, a wear take-up spring assembly in said housing urging the ball assembly components into proper bearing relation with each other and with the housing, and said ball assembly including a porous metal part having the pores thereof impregnated with non-metallic plastic bearing material locked therein and extending outwardly beyond the surface of the metal and providing plastic bearing nubbins separated from each other by the relatively recessed exposed metal surface portions between said pores of said porous part, said nubbins acting as the active bearing surface of the part.

2. A load carrying ball and socket type joint assembly which comprises an open-ended cup-shaped housing having a laterally extending attachment arm, a closure disk closing the large end of said housing, a spring bottomed on said closure disk, a spring seat carried by said spring, a stud having a cylindrical shank portion, a radially extending shoulder portion, and a rounded bottom rockably mounted on said spring seat, a porous metal ball member having a cylindrical bore therethrough receiving the shank of the stud and a flat bottom receiving the shoulder of the stud together with a fragmental spherical bearing wall tiltably mounted in the housing, said porous metal ball member having the surface pores thereof impregnated with a non-metallic plastic bearing material, said plastic bearing material projecting outwardly beyond the surface of the metal and providing a myriad of projecting plastic nubbins from each other by the relatively recessed exposed metal surface portions between the pores of said ball member, said plastic nubbins forming the active bearing surface of the surfaces of the ball member to engage the housing, the shank and the shoulder to thereby tiltably and rotatably support the stud.

3. A spring loaded joint assembly including a socket, a stud tiltable and rotatable in the socket, said joint having a porous metal bearing with a non-metallic plastic bearing material impregnated into and projecting outwardly from the pores thereof beyond the metal surface thereof providing a multitude of projecting plastic nubbins separated from each other by the relatively recessed exposed metal of the bearing surface between the pores of the bearing and providing active multi-point bearing contact with the socket.

References Cited in the file of this patent

UNITED STATES PATENTS

| 2,193,713 | Cole | Mar. 12, 1940 |
| 2,364,713 | Hensel | Dec. 12, 1944 |
| 2,365,552 | Hill | Dec. 19, 1944 |
| 2,369,091 | Venditty | Feb. 6, 1945 |
| 2,593,253 | Booth | Apr. 15, 1952 |
| 2,691,814 | Tait | Oct. 19, 1954 |

FOREIGN PATENTS

| 657,080 | Great Britain | Sept. 12, 1951 |
| 676,300 | Great Britain | July 23, 1952 |